March 9, 1965  M. PRAS  3,172,670
SEALS FOR HYDRAULIC RAMS
Filed Jan. 15, 1963
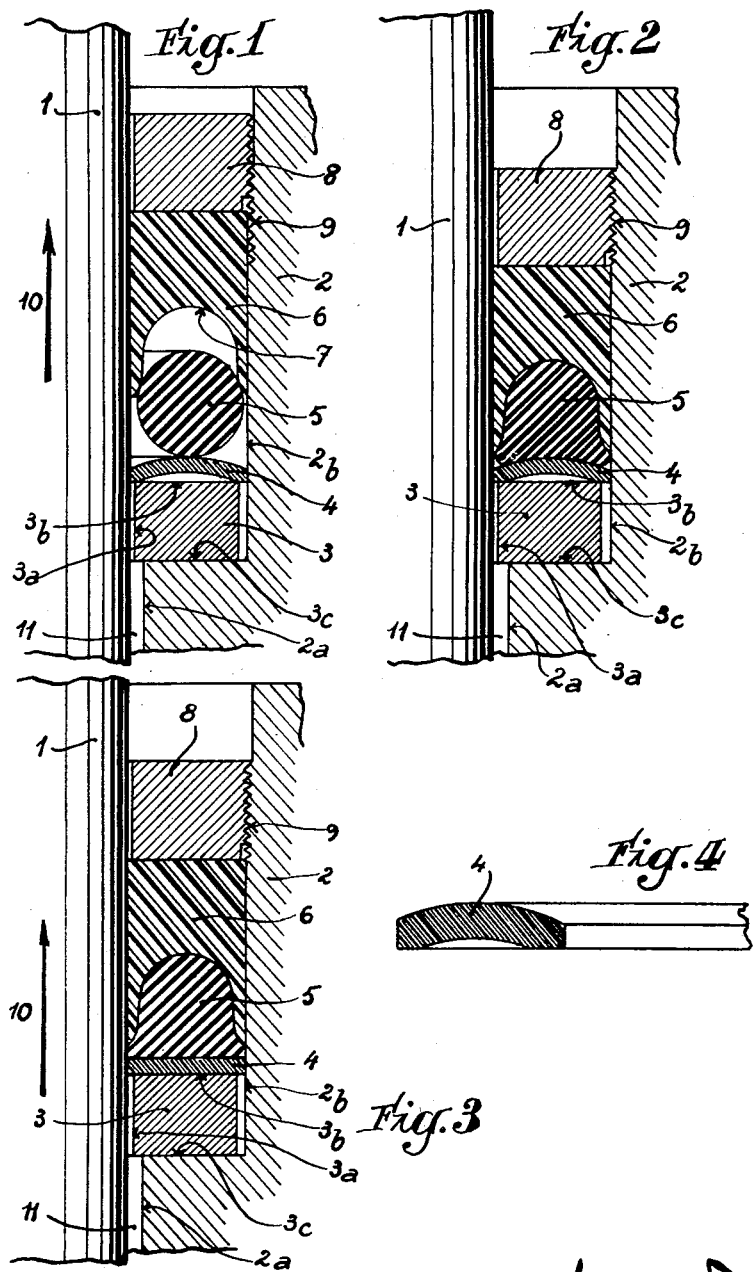

United States Patent Office 3,172,670
Patented Mar. 9, 1965

3,172,670
SEALS FOR HYDRAULIC RAMS
Marcel Pras, Saint-Etienne, France, assignor to Etablissements A. Marrel, Saint-Etienne, France, a French limited-liability company
Filed Jan. 15, 1963, Ser. No. 251,585
Claims priority, application France, Jan. 31, 1962, 42,247
1 Claim. (Cl. 277—112)

My invention relates to seals used in hydraulic rams to prevent leaks either along the rod of the ram, or along the cylinder thereof.

It is known in hydraulic rams to use a seal of the type comprising an annular member of U-shaped cross-section the lips of the groove of which bear respectively against the cylinder and against the rod, this U-shaped member being expanded by means of a ring adapted to be forced axially into the annular groove. The U-shaped member being generally made of a relatively hard material such as a polyamide, whilst the material of the ring is a highly deformable rubber or rubber substitute, it will be understood that a seal of this kind may be rapidly damaged under severe temperature and/or pressure conditions (for example above 100° C. and 3,600 p.s.i.). The combined effects of the unavoidable pressure waves and of the dilatation of the mechanical parts produce a superficial damaging of the ring, the material of which becomes extruded between the rod and its guide.

An object of the present invention is to prevent the above mentioned disadvantages on such hydraulic ram seals, by interposing an appropriate deformable washer between the ring and the side of the seal exposed to the fluid under pressure.

According to my invention a seal for a hydraulic ram comprises an annular member made of a hard slightly deformable polyamide having on one side a groove of U-shaped cross-section, the lips of which are adapted to bear respectively against the rod of the ram and against the cylinder thereof; a ring made of a more deformable material such as rubber or rubber substitutes, adapted to be forced into the groove of the said member and having a cross-sectional area slightly greater than the cross-sectional area of the said groove; a resilient slightly gutter-shaped washer of polyamide engaged around the rod with its convex side against the said ring and presenting a determined force fit respectively on the said rod and on the inner wall of the cylinder; and means for exerting on the said washer such an axial pressure that it forces the ring into the U-shaped annular member the lips of which are urged into fluid-tight contact with the rod, the said washer retaining its gutter-shaped form under normal conditions, but being able to flatten provisionally thus protecting the said ring against exaggerated stresses.

The annular member, the ring and the washer associated therewith may be disposed between a shoulder provided on the inner periphery of the cylinder of the ram and a metallic annular bushing screwed into the said cylinder.

In the annexed drawings:

FIG. 1 is a partial longitudinal section showing a seal according to the invention before axial compression.

FIG. 2 illustrates the seal in operative position under normal conditions.

FIG. 3 is a similar view corresponding to a provisional overcompression of the ring.

FIG. 4 is a partial axial section of the washer.

In FIGS. 1, 2 and 3 reference numeral 1 designates the rod of a hydraulic ram and reference numeral 2 the cylinder thereof. The internal diameter of cylinder 2 is slightly greater than the external diameter of rod 1, as indicated at 2a, except for the end of cylinder 2 which is bored at a larger diameter, as illustrated at 2b, and on the shoulder which separates portions 2a and 2b there is disposed a flat ring 3 of bronze, cast iron, steel or other relatively hard and rigid material. On this ring 3 rests a washer 4 (FIG. 4) made of a superpolyamide and having a slightly gutter-shaped cross-section. Said washer 4 has a force fit onto rod 1 and into cylinder 2. On washer 4 is disposed a highly deformable ring 5 of rubber or like deformable materials, the said ring being in the form of a torus with the innermost diameter substantially smaller than the internal diameter of the portion 2b of the bore of cylinder 2. On this ring 5 is located a sealing annular member 6 made of a hard slightly deformable polyamide. The annular member 5 is rectangular in cross-section and its lower face is formed with a deep annular groove 7 of substantially semi-circular profile.

The upper end of portion 2b of the bore of cylinder 2 is threaded and it receives a threaded metallic end bushing 8.

When the end bushing 8 is screwed down, the annular member 6, the highly deformable ring 5 and the washer 4 are compressed axially whereby the highly deformable ring 5 is driven into the groove 7, whilst washer 4 retains its gutter-shaped form (FIG. 2) thanks to its own relative rigidity and to its force fit. Ring 5 is then caused to fill up groove 7 of the annular member 6, the two lips of which are thus pressed respectively aganist the rod 1 and the wall of part 2b of cylinder 2.

There is thus obtained a perfectly fluid-tight seal, allowing a good operation of the ram under the most different pressures.

If in operation unusually high pressures are developed onto the highly deformable ring 5, owing to a local overheating, pressure shocks or like secondary phenomena, it will be understood that the reaction of said ring 5 onto the resilient washer 4 increases. Said washer 4 thus flattens progressively which has for a result that the pressure which it exerts on rod 1 and on the wall of the ram cylinder 2 increases correspondingly, thus improving the tightness of the seal and preserving ring 5 from being damaged by pressure shocks. This distortion of washer 4 may even bring it to the conformation illustrated in FIG. 3, where said washer is temporarily flat and applied against the upper face of the metallic ring 3.

As soon as these unusual conditions disappear, the washer returns to its original gutter-shaped form, under the action of its own resiliency and the seal is again at its normal operating position, as illustrated in FIG. 2.

I claim:

An annular seal for hydraulic rams and like structures wherein tightness is to be ensured between a cylinder and an axial rod movable with respect thereto, comprising an annular member made of a hard slightly deformable polyamide having on one side a groove of U-shaped cross-section, the lips of which are adapted to bear respectively against the rod of the ram and against the cylinder thereof; a ring made of a more deformable material of the class comprising rubber or rubber substitutes, adapted to be forced into the groove of said annular member and having a cross-sectional area slightly greater than the cross-sectional area of said groove, a resilient slightly gutter-shaped washer of polyamide engaged around the rod with its convex side against said ring and presenting a determined force fit respectively on said rod and on the inner wall of said cylinder; and means for exerting on said resilient washer such an axial pressure that it forces said ring into said U-shaped annular member, the lips of which are urged into fluid-tight contact with said rod and with said cylinder, said washer retaining its gutter-shaped form under normal conditions of use, but being able to flatten temporarily in order to provide to the said ring a supplementary expanding space when the stresses applied thereto overstep a predetermined limit.

References Cited by the Examiner
UNITED STATES PATENTS 2,445,410 7/48 Smith _____ 277—47
3,106,407 10/63 Mattingly _____ 277—188

FOREIGN PATENTS 759,233 10/56 Great Britain.
1,221,847 1/60 France.

EDWARD V. BENHAM, *Primary Examiner*.
SAMUEL ROTHBERG, *Examiner*.